(12) United States Patent
Ramirez-Martinez et al.

(10) Patent No.: US 6,419,075 B1
(45) Date of Patent: Jul. 16, 2002

(54) DEVICE FOR ALIGNING GLASS SHEETS ON A ROLLER CONVEYOR OF A GLASS ANNEALING LEHR

(75) Inventors: Salvador Ramirez-Martinez, Tlalpan; Pedro Gazca-Ortiz, México; Sergio Vite-Medina, Tecamac; José Luis Jimenez-Garay, México, all of (MX)

(73) Assignee: Tecnologia Vitro Vidrio y Cristal S.A. de C.V., Nuevo Leon (MX)

( * ) Notice: Subject to any disclaimer, the term of this patent is extended or adjusted under 35 U.S.C. 154(b) by 0 days.

(21) Appl. No.: 09/560,839

(22) Filed: Apr. 28, 2000

(30) Foreign Application Priority Data

Apr. 29, 1999 (MX) .............................................. 993989

(51) Int. Cl.[7] .............................................. B65G 47/24
(52) U.S. Cl. ........................................ 198/411; 198/400
(58) Field of Search ................................ 198/382, 384, 198/400, 411, 416; 65/253, 256, 257, 273

(56) References Cited

U.S. PATENT DOCUMENTS

| | | | |
|---|---|---|---|
| 4,058,200 A | 11/1977 | Frank | ......................... 198/382 |
| 4,493,412 A | 1/1985 | Krehnovi | ..................... 198/434 |
| 4,895,244 A | 1/1990 | Flaugher et al. | ............. 198/394 |
| 4,976,766 A | * 12/1990 | Kuster et al. | ............ 198/411 X |
| 5,131,951 A | * 7/1992 | Kuster et al. | ............ 198/411 X |
| 5,411,128 A | * 5/1995 | Vild et al. | ............... 198/411 X |
| 5,413,204 A | * 5/1995 | Mori et al. | .............. 198/411 X |

\* cited by examiner

Primary Examiner—James R. Bidwell
(74) Attorney, Agent, or Firm—Abelman, Frayne & Schwab

(57) ABSTRACT

The present invention is [referred] directed to a device for aligning glass sheets on a roller conveyor of a annealing lehr. The device comprises a supporting structure. A cylinder-piston assembly is attached to the supporting structure. A retention member is connected to the cylinder-piston assembly for supporting or for releasing an edge of the glass sheet, the retention member having a forward movement for supporting the edge of the glass sheet and a backward movement for releasing the glass sheet. A cylindrical piece is attached to the supporting structure over and above of the-retention member, in order to facilitate the sliding and centering of the glass sheet toward the retention member.

8 Claims, 4 Drawing Sheets

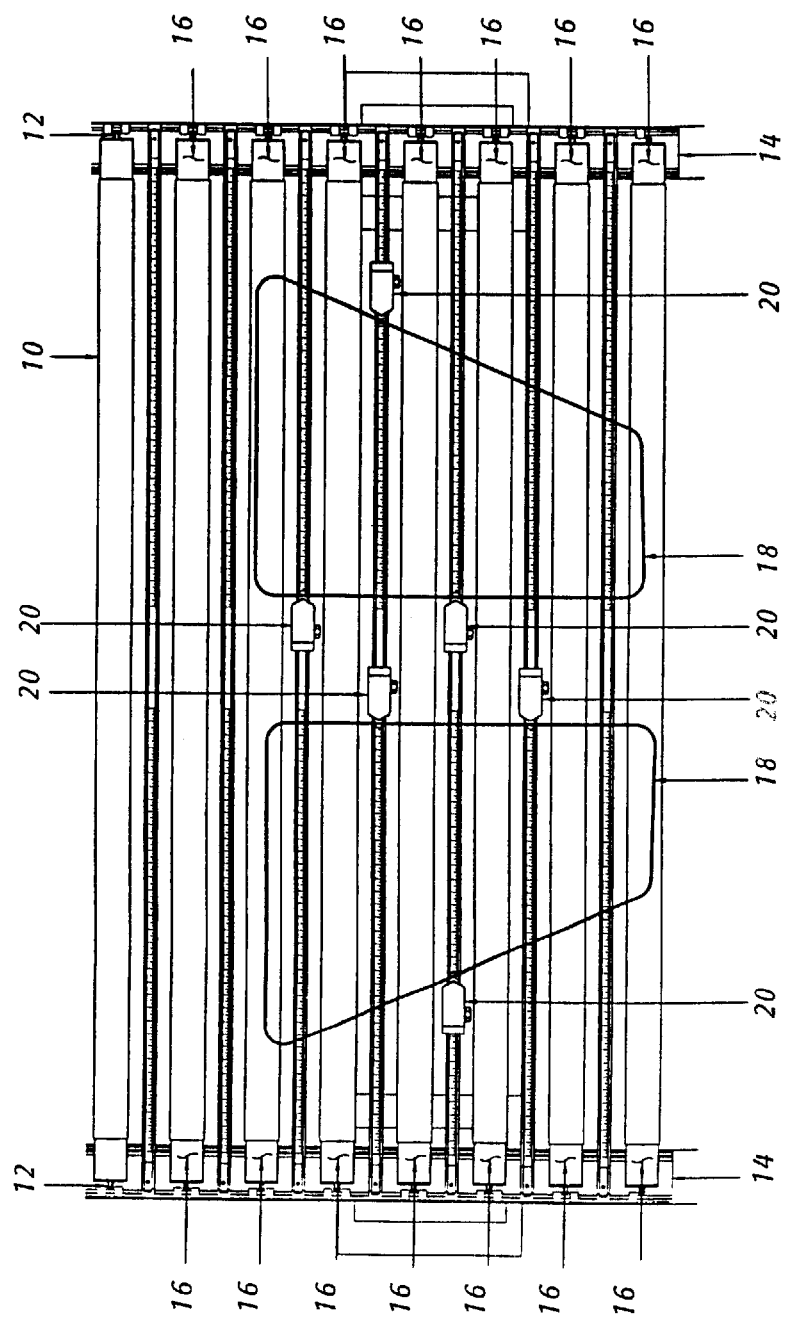
Figura 1

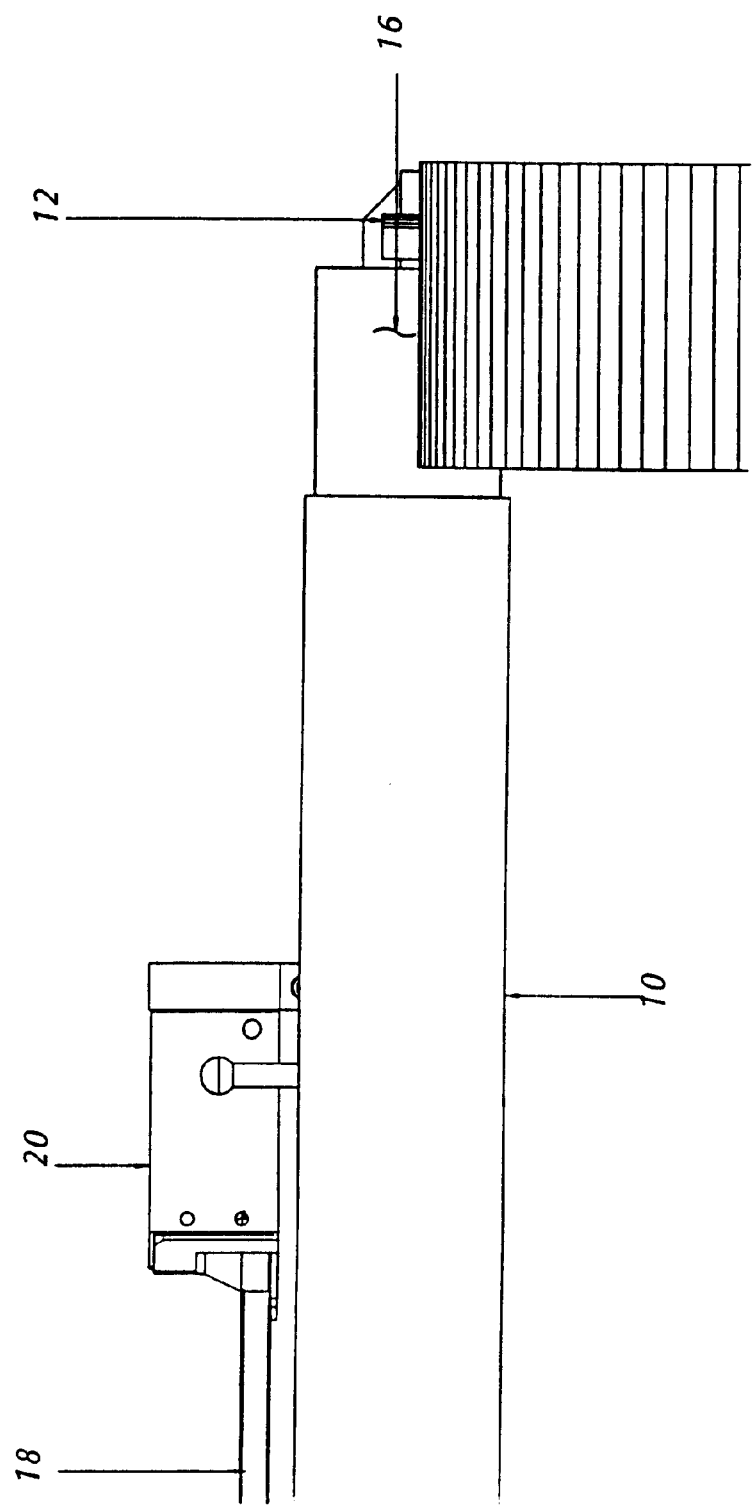
Figura 2

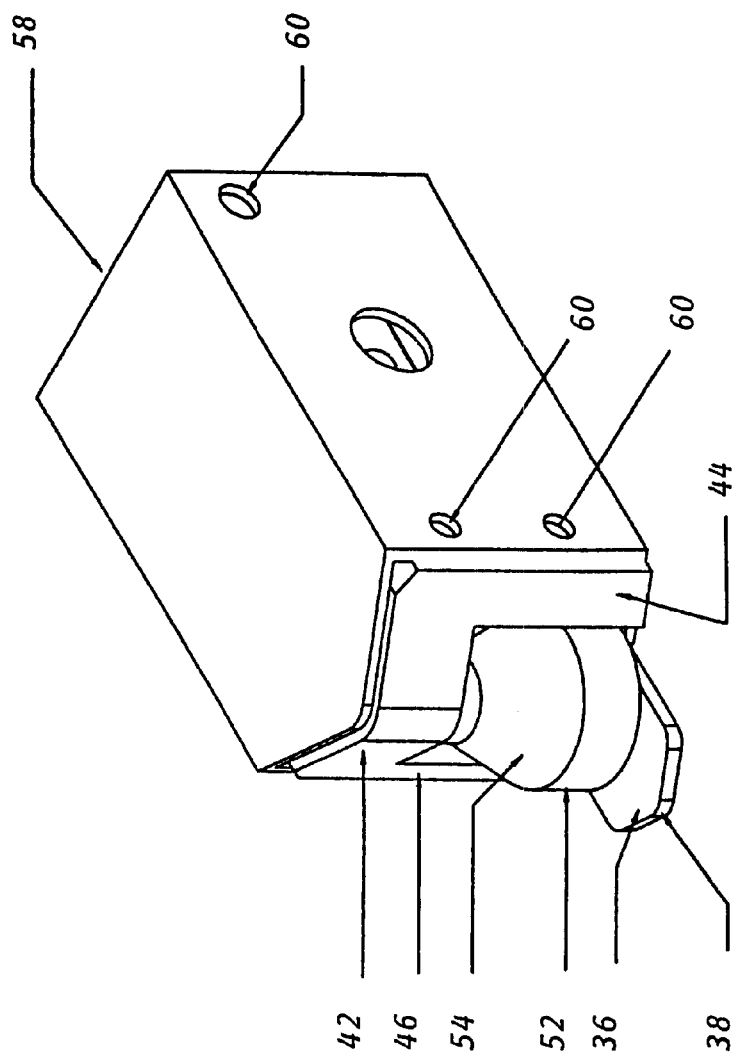
Figura 3

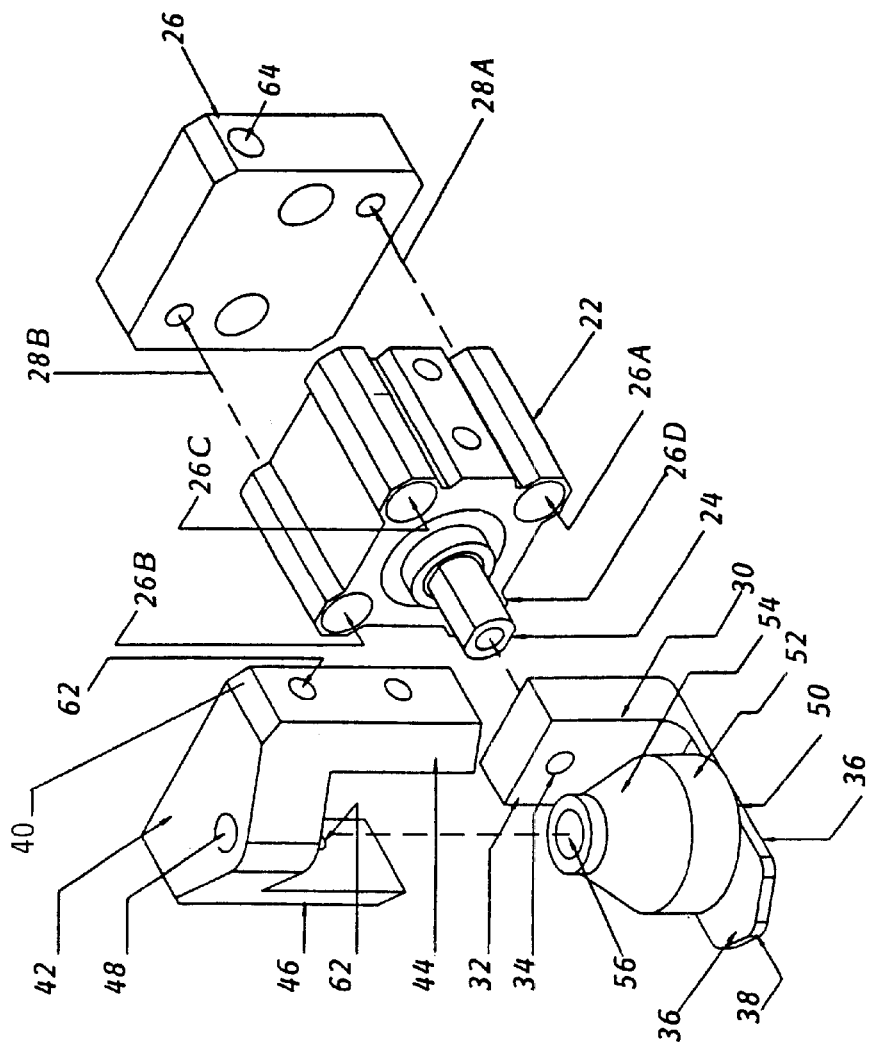
Figura 4

DEVICE FOR ALIGNING GLASS SHEETS ON A ROLLER CONVEYOR OF A GLASS ANNEALING LEHR

FIELD OF THE INVENTION

The present invention refers to a device for aligning glass sheets for its thermal treatment in an annealing lehr, and more specifically, to a device for aligning glass sheets used for the manufacture of windshields or automobile windows for thermal treating in an annealing lehr.

BACKGROUND OF THE INVENTION

During the tempering and bending process of windshields or automobile windows, the glass sheets, once that these has been cut in accordance with the desired shape, these are placed in a loading station in order to be transported by means of a roller conveyor through an annealing lehr, wherein these are subjected to a tempering, bending and cooling process.

However, one of the main problems of the bending and tempering process is that the glass sheets should be aligned in a precise position on the loading station, since that, during the transportation through the lehr, should coincide with the periphery of a bending mold in order to provide a required curvature to the glass.

The alignment of the glass is critical part of the process, since that, in case of a disalignment or a mis-oriented of the sheet, an erroneous curvature on the glass sheet can be provided.

At the present, exist already patents that describes the alignment of glass sheets on a roller conveyor, for example, the U.S. Pat. No. 4,058,200 issued to Robert G. Frank, which refers to an apparatus for aligning and orienting moving glass sheets immediately prior to their treatment. This invention is specially suitable for use with glass sheets heated while conveyed through a furnace on a roller conveyor where the glass becomes misaligned or mis-oriented prior to entry into a shaping station. The apparatus includes a pair of truncated conical rollers which engage the edge of the glass sheet and, due to their shape, substantially reduce chipping thereof. These rollers are mounted on a carriage in a manner to permit lateral movement relative to the carriage by cams. The carriage reciprocates along the path in a manner to move with the sheets. As the carriage returns, the glass engaging rollers are raised and laterally retracted so as to avoid contact with the oriented glass sheet.

The U.S. Pat. No. 4,493,412 issued to Richard J. Krehnovi, is referred to a glass sheet positioning apparatus for conveyor platform. In this patent, the flat glass sheets are horizontally conveyed and oriented in a precise location. Vertical stops pins removably affixed to a table attached to one end of the apparatus arrest the leading edge of the moving article where-upon pins removably mounted in a pair of transversely movable tables advance toward the article substantially normal to its arrival direction, thus engaging the edges of the article and orienting it in a vise-like manner. Lastly, adjustable pins mounted in a vertical and longitudinally moving table engage the trailing edge of the article and urge it toward the stops pins, thus orienting and aligning the article in a precise position relative to a fixed reference point. The apparatus is particularly adapted to the precise orientation and alignment of pattern cut sheets of glass to be removed from a conveyor platform by a robot.

Finally, the U.S. Pat. No. 4,895,244 issued to Jeffrey R. Flaugher is referred to an apparatus for aligning glass sheets moving on a conveyor line prior to shaping on a bending apparatus. The apparatus includes a pair of stops for engaging the leading edge of the glass sheets and a pair of pushers for engaging the end edges of the glass sheets to align the glass sheets with respect to a reference line.

Notwithstanding that already exists apparatuses for aligning and orienting the glass sheets, one of the main problems is that the stops that aligns the glass sheets are manufactured of nylon in order to avoid the contact of metal with the glass. However, due to that the exposing part of nylon that is in contact with glass is fixed, after certain number of handling operations, the nylon this is in contact with the glass is gradually wear down, which provokes a disalignment of the glass sheet.

With the finality of improving the adjust and to extend the useful operation life of the apparatuses for aligning glass sheets on a roller conveyor, the present invention is referred to a device for aligning glass sheets for the manufacture of windshields or automobile windows. This device being adaptable to a loading station for glass sheets, said device comprising, a supporting structure; an antirotation cylinder-piston assembly of single-acting which attached to the supporting structure; a retention member connected to the piston for supporting or release the edge of a glass sheet, said retention member having a forward movement for supporting the edge of the glass sheet and a backward movement for releasing said glass sheet; and a conical circumferential piece, for example, made of nylamid material, which is attached to the supporting structure over and above of said retention member, in order to facilitate the centering and sliding of the glass sheet toward the retention member. In this way, the glass sheet is placed between various alignment devices in a loading station, in such way that, the edges of the glass sheet be slidable on the surface of the conical circumferential piece until the glass sheet is centered and aligned on the retention member of the device of the present invention.

Once that the glass sheet is centered on the various devices, the cylinder-piston assembly of each device is operated and the retention member has a backward movement and so, the glass sheet is released on a roller conveyor, which will transport the glass sheet toward a bending and tempering process of glass sheets.

OBJECTIVES OF THE INVENTION

It is a first objective of the present invention to provide a device for aligning glass sheets on a roller conveyor, which increases the number of operations in the handling of glass sheets, providing a conical circumferential piece, which rotates freely, avoiding that the conical circumferential pieces that are making contact with the glass be changed frequently.

An additional objective of the present invention, is to provide a device for aligning glass sheets on a roller conveyor, that diminish the wear down of the conical circumferential pieces that are making contact with the glass.

Is another objective of the present invention, to provide a device for aligning glass sheets on a roller conveyor, which facilitate the alignment and centering of the glass sheets.

These and other objectives and additional advantages of the present invention will be evident to those persons who are experts in the field of the following detailed description of the invention, which will be made with reference to a specific embodiment of it in an illustrative sense but not one that would limit the invention.

BRIEF DESCRIPTION OF THE DRAWINGS

FIG. 1 is an upper plant view showing in a schematic form a roller conveyor with a glass sheet on the upper part;

The FIG. 2 is a lateral view that shows in a schematic form, the location of the device for aligning glass sheets with respect the roller conveyor;

The FIG. 3 shows a general arrangement in a conventional perspective of the device for aligning glass sheets in accordance with the present invention; and, The FIG. 4 is a conventional perspective of the device showed on FIG. 3, showing its parts disassembled.

DETAILED DESCRIPTION OF THE INVENTION

Now follows a reference to a specific embodiment of the present invention that is illustrated in the figures which are attached and where the same numbers refer to the same parts and wherein FIG. 1 shows a view in an upper plant and in an schematic way a plurality of rolls 10, which attached by their ends through bearings 12, which are located on a supporting structure 14. Said rolls 10 are assembled to rotate synchronously through its shaft by means of a roll drive system 16, which are respectively connected to a driving motor (not shown). The FIG. 1 shows in a schematic representation of a glass sheet 18, which can be a windshield or automobile windows, that is placed on a series of alignment and centering devices 20 of said loading station (not shown), which, once that the glass sheet 18 been aligned and centered, this is released to be placed on the plurality of rolls 10. Due to the rolls 10 are continuously rotating, these transport the glass sheet 18 through of an annealing lehr (not shown) to be subjected to a tempering, and bending process.

Making now reference to the FIGS. 3 and 4, these show in a detailed form, the device for the alignment of glass sheets 18 of the present invention, which comprises: a cylinder-piston assembly 22, said cylinder 22 having a shaft 24. The cylinder-piston assembly 22, being an antirotation cylinder-piston assembly 22 of single-acting, including four longitudinally extending passages 26A, 26B, 26C and 26D near of the periphery of the cylinder-piston assembly 22. A first retention support 26 located at the back section of the cylinder-piston assembly 22. The first retention support 26 including at least two longitudinally orifices 28A and 28B, which are in coincidence with the longitudinally extending passages 26A and 26B of the cylinder-piston assembly 22. An angular retention member 30 connected to the shaft 24 of the cylinder-piston assembly 22 to support or to release the edge of the glass sheet 18, said angular retention member 30 having a forward movement for supporting the edge of the glass sheet 18 and a backward movement for releasing said edge of the glass sheet 18. The forward and backward movement of angular retention member 30, being carried out by the movement of the cylinder-piston assembly 22.

The angular retention member 30 having a first vertical section 32 which comprises a longitudinal orifice 34 through which is introduced a screw (not shown) to be connected to the free end of the shaft 24 and a second horizontal section 36 connected in an angular position of 90°, in the lower part of first vertical section 32. The free end of second horizontal section 36 has formed a semicircular edge 38.

The first full paragraph on page 6 should now read as follows:

A second retention member 40 located at the frontal section of cylinder-piston assembly 22. The second retention member 40 being formed of a single piece, which comprises a transverse upper piece 42 and two lateral sections 44 and 46. The lateral sections 44 and 46 being used as guides for locating and for positioning the upper part of the first vertical section 32 of the angular retention member 30. The upper piece 42 having a threaded vertical passage 48, that vertically crosses said transverse upper piece 42.

A conical circumferential piece 50, of plastic material, for example of Nylamid material, which is attached to the second retention member 40, over said second retention member 40, to facilitate the centering and sliding of the glass sheet toward the angular retention member 30. Said conical circumferential piece 50 comprising a first cylindrical section 52 on the lower part, and a second truncate conical section 54 on the upper part. The cylindrical piece 50 comprises a central orifice 56, which crosses the cylindrical piece 50 in a vertical way.

The cylindrical piece 50 is attached under the lower part of the transverse upper piece 42 of the second retention member 40. A screw (not shown) is placed under the lower section of the cylindrical piece 50 crossing the central orifice 56. The screw is connected to the threaded vertical passage 48 of the transverse upper piece 42. The cylindrical piece 50 being connected to freely rotate on the second retention member 40.

Finally, a housing 58 to cover the cylinder-piston assembly 22, the first retention support 26, a part of the angular retention member 30 and the second retention member 40. The housing 58 is attached through screws (not shown) by means of the orifices 60, which are located in coincidence with the threaded orifices 62 on the second retention member 40 and in threaded orifices 64 of the first retention support 26.

Once that the device 20 of the present invention has been described, this can be attached in combination with other similar devices 20, in a loading station (not shown) in such way that the edges of the glass sheet be slidable on the cylindrical piece 50 until these are centered and aligned on the second horizontal section 36 of the device 20 of the present invention. So, once the glass sheet 18 is placed and centered on the loading station, the second horizontal section 36 having a backward movement to release the glass sheet 18 on the plurality of rolls 10. Once the glass sheet 18 is released, the second horizontal section 36 has a forward movement to again support the edge of the following glass sheet 18.

As can be seen from the embodiment above described, a device for aligning glass sheets on a roller conveyor, to be used in a tempering and bending process for glass sheets. However, it must be understood that the invention should not be limited to the embodiment above described, and it will be apparent to the experts in the field that other diverse embodiments could be implemented, along with alternative embodiments which will be clearly contained within the spirit of the present invention which are claimed in the following claims.

We claim:

1. A device for aligning glass sheets on a roller conveyor of a annealing lehr, which comprises a supporting structure; a cylinder-piston assembly attached to the supporting structure; a retention member connected to the piston for supporting or releasing an edge of the glass sheet, said retention member having a forward movement for supporting the edge of the glass sheet and a backward movement for releasing said glass sheet; and a cylindrical piece attached to the supporting structure over and above said retention member, whereby the centering and sliding of the glass sheet toward the retention member is facilitated.

2. A device for aligning glass sheets on a roller conveyor of a annealing lehr, as claimed in claim 1, wherein the supporting structure includes: a first retention support located in a back section of the cylinder-piston assembly; and a second retention member located in a front section of the cylinder-piston assembly.

3. The device for aligning glass sheets on a roller conveyor of a annealing lehr, as claimed in claim 1, wherein the second retention member comprises a transverse upper piece and two lateral sections, said lateral sections being used as guides for locating and positioning the upper part of the angular retention member.

4. A device for aligning glass sheets on a roller conveyor of a annealing lehr, as claimed in claim 1, wherein the cylindrical piece includes a first cylindrical section on the lower part, and a second truncated conical section on the upper part, said cylindrical piece also including a central orifice which crosses the cylindrical piece in a generally vertical manner.

5. A device for aligning glass sheets on a roller conveyor of a annealing lehr, as claimed in claim 1, wherein the cylindrical piece is of nylamid material.

6. A device for aligning glass sheets on a roller conveyor of a annealing lehr, as claimed in claim 2, wherein the supporting structure includes a housing.

7. A device for aligning glass sheets on a roller conveyor of a annealing lehr, as claimed in claim 1, wherein the retention member comprises a first vertical section, said first vertical section being connected to the cylinder-piston assembly; and, a second horizontal section connected with an angular position of 90° in a lower part of the first vertical section, for supporting the edge of a glass sheet.

8. A device for aligning glass sheets on a roller conveyor of a annealing lehr, as claimed in claim 1, wherein the cylinder-piston assembly is an anti-rotation cylinder-piston assembly of the type of single-acting.

* * * * *